US009441740B2

(12) United States Patent
Kennedy (10) Patent No.: US 9,441,740 B2
(45) Date of Patent: Sep. 13, 2016

(54) CARTRIDGE SEATED PLUG VALVE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 8 days.

(21) Appl. No.: 14/546,236

(22) Filed: Nov. 18, 2014

(65) Prior Publication Data

US 2016/0138722 A1    May 19, 2016

(51) Int. Cl.
*F16K 5/04* (2006.01)
*F16K 25/00* (2006.01)
*F16K 27/06* (2006.01)

(52) U.S. Cl.
CPC .............. *F16K 5/045* (2013.01); *F16K 5/0464* (2013.01); *F16K 25/005* (2013.01); *F16K 27/065* (2013.01)

(58) Field of Classification Search
CPC .... F16K 5/045; F16K 5/0464; F16K 27/065; F16K 25/005; Y10T 137/0519; Y10T 137/6058; Y10T 137/6041
See application file for complete search history.

(56) References Cited

U.S. PATENT DOCUMENTS

| 3,064,940 A | * | 11/1962 | Anderson | ............... F16K 5/045 |
| | | | | 137/556.3 |
| 4,697,786 A | | 10/1987 | Kennedy | |
| 4,887,629 A | * | 12/1989 | Wilson | .................. F16K 27/065 |
| | | | | 137/15.24 |

\* cited by examiner

*Primary Examiner* — Marina Tietjen
(74) *Attorney, Agent, or Firm* — Brown & Michaels, PC (57) ABSTRACT

A cartridge seated plug valve includes a hollow body with an inlet, an outlet, and a cylindrical valve chamber. A C-shaped rotor with an elastomeric coating is rotatably held in the valve chamber by a valve cover and a base. A valve facing with an elastomeric gasket is held adjacent to the inlet, with a central aperture of the valve facing aligned with the inlet, and the elastomeric gasket held in compression about an inlet seal surface at a perimeter of the inlet, by facing channels in the cover and base. In a closed position, the rotor is oriented with the elastomeric coating of the plug segment sealing the central aperture. The valve is opened by rotating the main stem, changing an orientation of the rotary plug, and moving the plug segment away from the inlet.

6 Claims, 5 Drawing Sheets

CARTRIDGE SEATED PLUG VALVE

FIELD OF THE INVENTION

The invention pertains to the field of hydraulic valves. More particularly, the invention pertains to cartridge seated plug valves.

DESCRIPTION OF RELATED ART

A cartridge plug valve generally includes a hollow valve body with at least one inlet and one outlet each passing through the hollow valve body at opposing sides of a cylindrical valve chamber internal to the hollow valve body. Typically the hollow valve body is constructed of cast iron, but any material that is structurally sound and non-reactive with fluids passing through the cartridge plug valve may be used. A surface of a wall of the cylindrical valve chamber surrounding the inlet forms an inlet seal surface. The cylindrical valve chamber is sealed with a base at a first end of the hollow valve body. The base may be a unitary element of the hollow valve body and part of a single casting, or may be attached to the hollow valve body by welding, bolts, or other types of fasteners, thus closing the first end of the cylindrical valve chamber.

A cartridge includes a C-shaped rotor and a valve cover. The C-shaped rotor includes a plug segment with a first end and a second end. The first end of the plug segment is connected to the trunnion by a first elbow segment, and the second end of the plug segment is connected to the main stem by a second elbow. The main stem passes through a main stem journal of the valve cover, and the base includes a trunnion journal for accepting the trunnion. Thus, when the cartridge is inserted into the cylindrical valve chamber of the hollow valve body, the valve cover seals the cylindrical valve chamber at the second end of the hollow valve body, and the rotor is free to rotate in the trunnion journal and the main stem journal which share a common axis defined by a center of the trunnion journal and a center of the main stem journal, and henceforth referred to herein as the rotor axis.

As shown in a prior patent by the present inventor, Kennedy (U.S. Pat. No. 4,697,786, issued 1987), the rotor axis is offset from a central axis of the cylindrical valve chamber so that the rotor turns eccentrically relative to the cylindrical valve chamber. Thus, when the rotor is in a first position, a seal surface of the plug segment is held in contact with the inlet seal surface. When the rotor is turned to a second orientation, generally at a right angle to the first orientation, the plug segment rotates away from the inlet, and due to the eccentricity of the rotor axis relative to the cylindrical valve chamber axis, also moves radially away from the wall of the cylindrical valve chamber. As a result, the plug segment does not contact the surface of the valve chamber or other valve components when in motion, wear on seal surfaces is minimized, and valve operation requires less effort.

In the prior art, seal integrity at the inlet seal surface has been improved by various constructions. In some constructions, a nickel alloy seat ring is welded into the side of the cylindrical valve chamber surrounding the inlet and forms the inlet seal surface. Additionally, the plug segment of the rotor is coated with an elastomeric layer. Thus, when the plug segment is rotated into the first orientation covering the inlet, the elastomeric coating of the plug segment is compressed against the nickel alloy ring of the inlet seal surface forming a tight seal, and flow of a fluid through the inlet into the cylindrical valve chamber is blocked.

While this construction is effective, manufacturing costs may be significant. Nickel alloy is a durable metal that is easily welded to, or integrated into, a cast iron hollow valve body. However, nickel alloy is relatively expensive compared to other metals, and integration of the nickel alloy seating ring into the hollow valve body may require significant machining after casting. Further, in the event of damage to the nickel alloy seating ring, the entire hollow valve body may require replacement.

Also, the prior art Kennedy patent (U.S. Pat. No. 4,697,786, issued 1987) describes a cartridge plug valve having a removable inlet seal surface. In this construction, a metal plate conforms to the wall of the cylindrical valve chamber surrounding the inlet. The metal plate has a central aperture that is the same size of the inlet and aligned with the inlet. An elastomeric coating is applied to both sides of the metal plate and forms a seal surface on both sides of the plate. A channel in the base of the hollow valve body accepts a first end of the metal plate, and a pin in the valve cover mates with a slot cut into a second end of the metal plate. Thus, when the cartridge and hollow valve body are assembled, the metal plate is held firmly against the wall of the valve chamber at the location of the inlet, and is also prevented from rotating within the valve chamber so that alignment with the inlet is maintained.

A cast iron rotor is cast with an integral nickel alloy ring in the plug segment of the rotor. After machining the plug segment containing the nickel alloy ring to a finished profile, the nickel alloy ring forms a seal surface with the elastomeric coating of the metal plate surrounding the inlet. In the first position of the rotor, the seal surface of the plug segment is held against the central aperture of the metal plate, deforming the elastomeric coating of the metal plate to both the seal surface of the plug segment, and the inlet, thus preventing flow of a fluid from the inlet into the cylindrical valve chamber. When the rotor is moved to a second position, the plug segment rotates away from the metal plate, and also radially away from the metal plate and the wall of the cylindrical valve chamber. Thus, a fluid is permitted to flow from the inlet, through the central aperture of the metal plate, and into the cylindrical valve chamber.

This construction provides an effective inlet seal, and allows the metal plate forming the inlet seal surface to be easily replaced if necessary. However, the nickel alloy ring cast into the plug segment of the cast iron rotor increases construction materials costs and finishing time to shape the final seal surface of the plug segment. Further, in the event of damage or wear to the seal surface of the plug segment, the entire rotor must be replaced.

SUMMARY OF THE INVENTION

A cartridge seated plug valve of a construction described herein includes a hollow valve body with a cylindrical valve chamber passing between a first end and a second end of the hollow valve body. The cylindrical valve chamber includes a cylindrical wall and a cylindrical valve chamber axis. An inlet passes through the hollow valve body into the cylindrical valve chamber at a first location and an outlet passes through the hollow valve body into the cylindrical valve chamber at a second location. A seal surface surrounds the inlet on the cylindrical valve chamber wall.

A base is attached to the hollow valve body sealing the cylindrical valve chamber at the first end of the hollow valve body. The base has an inner side including a trunnion journal for receiving a trunnion. The trunnion journal has a center that is radially offset from the cylindrical valve chamber axis. A first facing channel with a radius of curvature having an origin at the cylindrical valve chamber axis is defined in the inner side of the base.

A valve cover seals the cylindrical valve chamber at the second end of the hollow valve body. The valve cover has an inner side and an outer side, and includes a main stem journal passing from the inner side to the outer side. The main stem journal has a center that is radially offset from the cylindrical valve chamber axis. A second facing channel with a radius of curvature having an origin at the cylindrical valve chamber axis is formed in the inner side of the valve cover. The center of the main stem journal and the center of the trunnion journal define a rotor axis.

A rotor includes a plug segment with a first end and a second end. The first end of the plug segment is connected to a trunnion by a first elbow segment, and the second end of the plug segment is connected to the main stem by a second elbow segment. The plug segment also has a sealing surface. An elastomeric coating is applied to the first elbow, the second elbow, and the plug segment. The rotor is rotatably held by the main stem being accepted by the main stem journal of the valve cover, and the trunnion being accepted by the trunnion journal of the base. The first elbow segment and the second elbow segment hold the plug segment parallel to the rotor axis with the elastomeric coating of the plug segment adjacent to the seal surface of the inlet of the hollow valve body.

A valve facing has a body with a first side and a second side opposite the first side. An elastomeric gasket is bonded to the first side of the body. The body of the valve facing has a radius of curvature that is the same as the radius of curvature of the first facing channel and the radius of curvature of the second facing channel. A first end of the valve facing body is held in the first facing channel, and a second end of the valve facing body is held in the second facing channel. A central aperture passing through the valve facing is coincident with the inlet of the valve body.

When the rotor is in a first orientation with the plug segment adjacent the second side of the body of the valve facing, the eccentric axis of rotation of the rotor forces the elastomeric coating of the plug segment against the second side of the body of the valve facing. The central aperture of the valve facing is thus sealed, blocking flow of a fluid from the inlet into the cylindrical valve chamber. When the rotor is rotated to a second orientation, the plug segment of the rotor moves away from the body of the valve facing. In this orientation, the plug segment of the rotor no longer seals the central aperture of the body of the valve facing, and flow of a fluid from the inlet into the cylindrical valve chamber is permitted.

DETAILED DESCRIPTION OF THE INVENTION

A cartridge seated plug valve of a construction described herein provides a replaceable valve facing that effectively seals an inlet of a hollow valve body, and also eliminates the nickel seating ring common in the prior art in either the hollow valve body or the plug segment of the rotor. Thus, material costs are reduced, and extensive machining of an inlet seal surface and/or a plug segment seal surface is significantly reduced or eliminated. Thus, the cartridge seated plug valve reduces overall production costs, and also simplifies maintenance and reduces maintenance costs.

Figure 1:
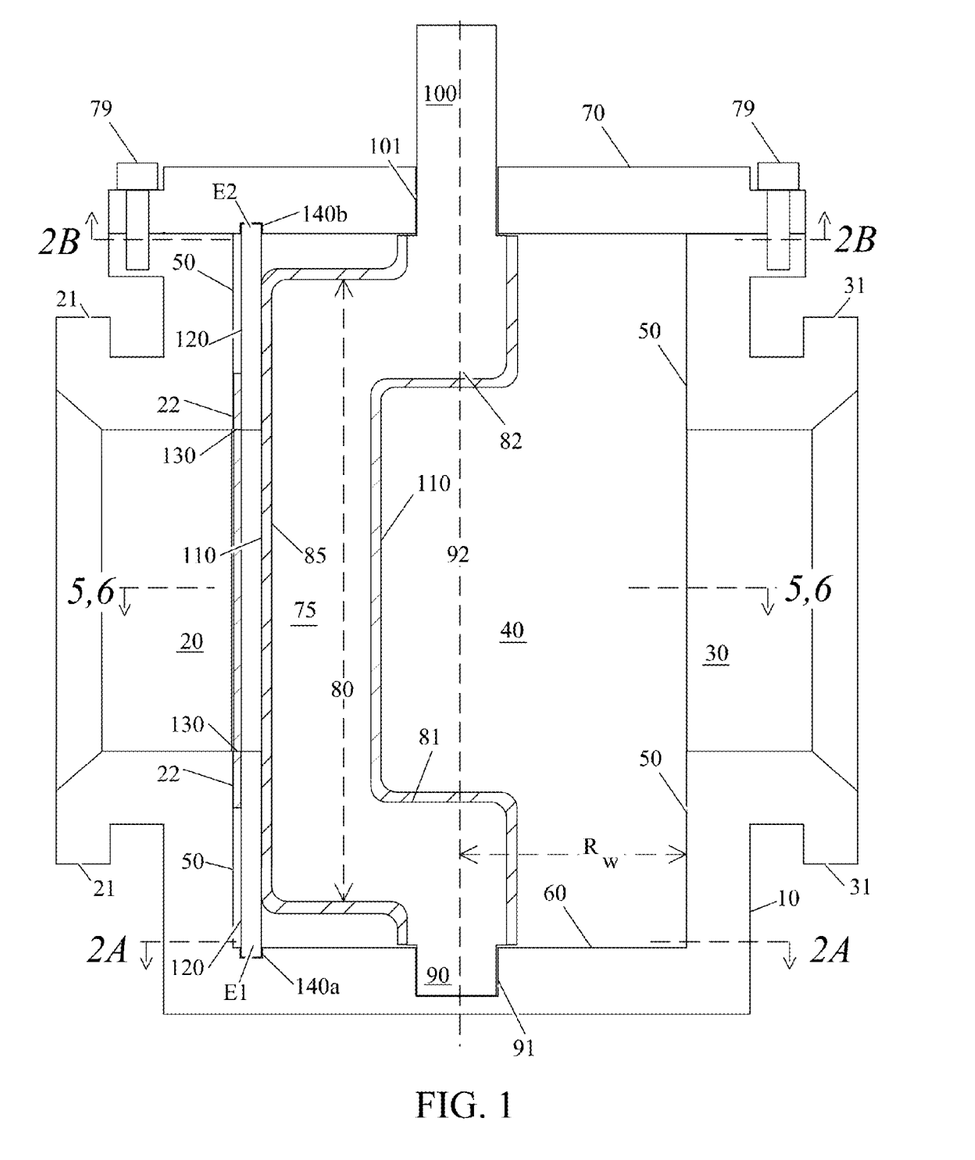
FIG. 1 shows a cartridge seated plug valve of a construction described herein.

An embodiment of the cartridge seated plug valve is shown in FIG. 1. The cartridge seated plug valve has a hollow valve body 10. A hollow cylinder internal to the hollow valve body 10 forms a cylindrical valve chamber 40 that allows fluid flow between an inlet 20 and an outlet 30 when the cartridge seated plug valve is opened. A wall 50 of the cylindrical valve chamber 40 has a radius of curvature $R_w$ whose origin defines a valve chamber axis 92. The inlet 20 is provided with an inlet flange 21, and the outlet 30 is provided with an outlet flange 31. Thus the hollow valve body 10 may be assembled in-line with a piping system through, for example, welding or bolting the inlet flange 21 and outlet flange 31 to appropriate mating flanges on pipes.

Figure 2A:
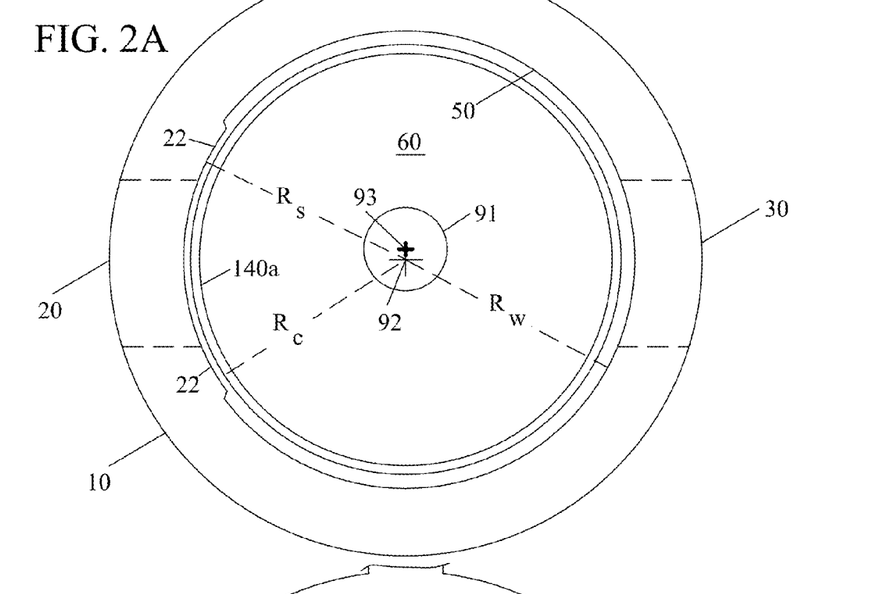
FIG. 2A shows an inner surface of a hollow valve body base.

A base 60 seals the cylindrical valve chamber 40 at a first end of the hollow valve body 10, and may be formed as an integral element of the hollow valve body 10 in a single casting. Alternatively, the base 60 may be formed as a separate element and affixed to the hollow valve body 10 with bolts, welds, or other techniques known in the art. As shown in FIG. 1 and FIG. 2A, an inner surface of the base 60 is provided with a trunnion journal 91. In FIG. 1 and FIG. 2A, the trunnion journal 91 is shown as a simple cylindrical cup in the base 60 that is open to the cylindrical valve chamber 40. However, bearings of any suitable type, or other elements that facilitate acceptance of a rotating member, such as a trunnion 90, may also be used.

As shown in FIG. 2A, the trunnion journal 91 has a center that is coincident with a rotor axis 93, and the rotor axis 93 is slightly offset from the valve chamber axis 92 in a lateral direction relative to the placement of the inlet 20 in the hollow valve body 10. The inner surface of the base 60 is also provided with a first facing channel 140a. The first facing channel 140a is arcuate in shape and has a radius of curvature whose origin is coincident with the valve chamber axis 92. The first facing channel 140a follows a circumferential path at a radial distance $R_c$ from the valve chamber axis 92, generally from a location at a first side of the inlet 20, past the inlet 20 and to a location at a second side of the inlet 20. However, the first facing channel 140a in FIG. 2A is shown as a complete circle for ease of manufacturing. The first facing channel 140a is co-axial with an inlet seal surface 22 formed in the wall 50 of the cylindrical valve chamber 40 surrounding the inlet 20. The inlet seal surface 22 has a radius of curvature $R_s$ with an origin at the valve chamber axis 92.

Figure 2B:
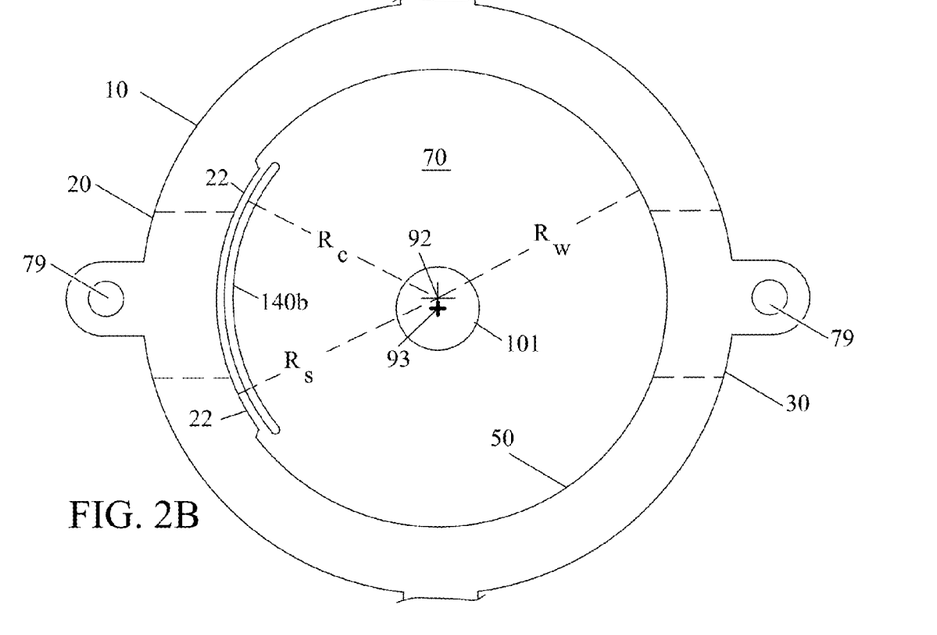
FIG. 2B shows an inner surface of a valve cover.

Referring to FIG. 1 and FIG. 2B, a valve cover 70, being the first element of a cartridge, seals the cylindrical valve chamber 40 at a second end of the hollow valve body 10, and may be removably attached to the hollow valve body 10 with screws 79, bolts, or other types of fasteners. The valve cover 70 is provided with a main stem journal 101 that passes through the valve cover 70. In FIG. 1 and FIG. 2B, the main stem journal 101 is shown as a simple cylindrical aperture passing through the valve cover 70. However, bearings of any suitable type, or other elements that facilitate acceptance of a rotating member, such as a main stem 100, passing through the valve cover 70 may also be used.

The main stem journal 101 has a center that is coincident with the rotor axis 93, and the rotor axis 93 is slightly offset from the valve chamber axis 92 in a lateral direction relative to the placement of the inlet 20 in the hollow valve body 10. An inner surface of the valve cover 70 is provided with a second facing channel 140b. The second facing channel 140b is arcuate in shape and has a radius of curvature whose origin is coincident with the valve chamber axis 92. The second facing channel 140b follows a circumferential path, at a radial distance $R_c$ from the valve chamber axis 92, from a location at a first side of the inlet 20, past the inlet 20 and to a location at a second side of the inlet 20. The second facing channel 140b is also co-axial with the inlet seal surface 22 formed in the wall 50 of the cylindrical valve chamber 40 surrounding the inlet 20.

Comparing FIG. 2A and FIG. 2B, it will be apparent that the offset of the rotor axis 93 on the inner surface of the base 60 and offset of the rotor axis 93 on the inner surface of the valve cover 70 are in opposite directions relative to the valve chamber axis 92. Thus, when the base 60 and valve cover 70 are in place at opposite ends of the hollow valve body 10, the trunnion journal 91 and main stem journal 101 will be in alignment on the rotor axis 93. Similarly, the second facing channel 140b will also be aligned with at least an arc length of the first facing channel 140a when the valve cover 70 and base 60 are assembled with the hollow valve body 10.

The valve cover 70 and/or main stem journal 101 may also be fitted with seals, packing, or other elements known in the art that prevent fluid from passing through the main stem journal 101 from the cylindrical valve chamber 40. Additionally, a crown with any end play adjustment mechanism known in the art may also be added to the valve cover 70 to ensure proper compression of the rotor 75 against the valve cover 70 as well as proper pressure on packing or other main stem journal 101 elements. Journal seals, packing, and end play adjustment mechanisms are well known in the art, and are omitted here for clarity, as they do not affect the novelty or utility of the cartridge seated plug valve described herein.

Figure 5:
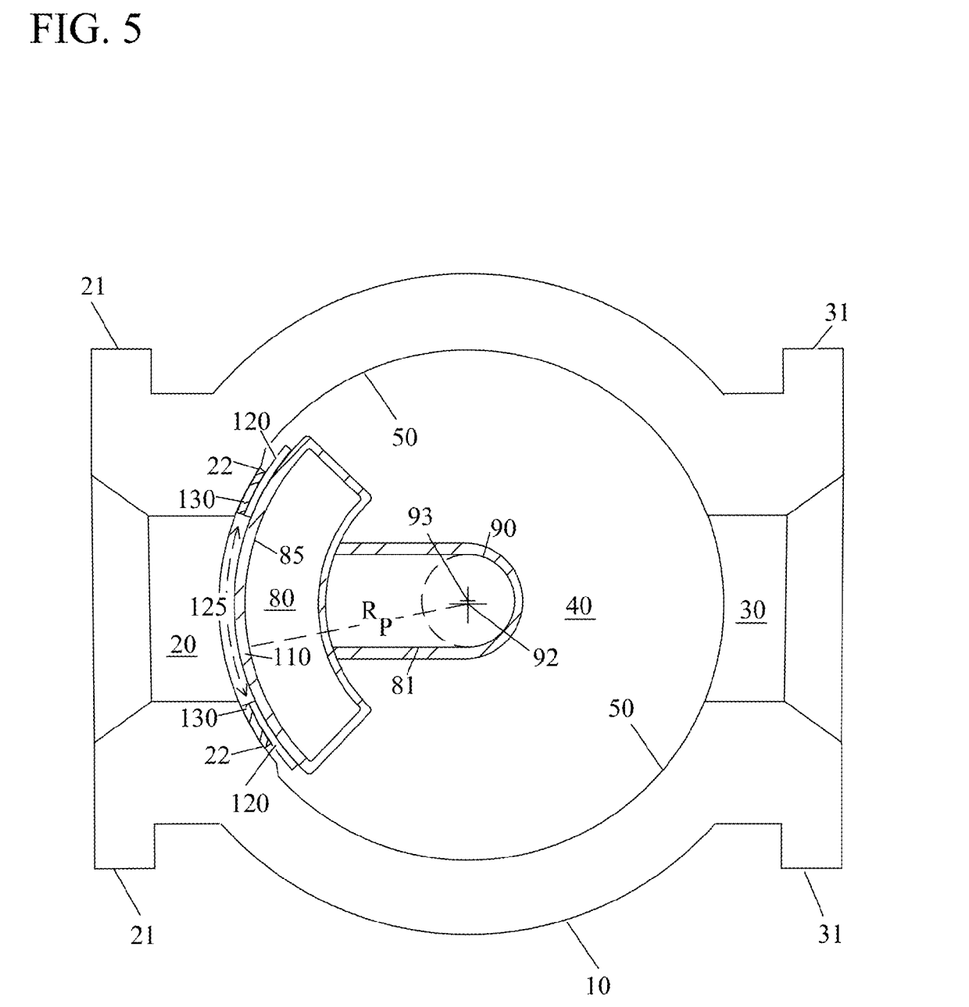
FIG. 5 shows a cross-section of a cartridge seated plug valve in a closed position at a location indicated by 5 in FIG. 1.

As shown in FIG. 1, a rotor 75, the second element of the cartridge, includes a plug segment 80 that is aligned parallel to the valve chamber axis 92. A first end of the plug segment 80 is connected to the trunnion 90 by a first elbow segment 81. A second end of the plug segment 80 is connected to the main stem 100 by a second elbow segment 82. Thus, the rotor 75, including the first elbow segment 81, the plug segment 80, and the second elbow segment 82, forms a C-shape. The first elbow segment 81 and second elbow segment 82 are dimensioned to hold a plug seal surface 85 of the plug segment 80 in close proximity to the inlet seal surface 22 surrounding the inlet 20 when the rotor 75 is in a first position with the plug segment 80 aligned with the inlet 20. As shown in FIG. 5, at the first position the plug seal surface has a radius of curvature $R_p$ with an origin in alignment with the valve chamber axis 92.

The plug segment 80 of the rotor 75 is also provided with an elastomeric coating 110 that covers at least the plug seal surface 85 of the plug segment 80 of the rotor 75. In one embodiment, the elastomeric coating covers the entire plug segment 80, the first elbow 81, and the second elbow 82. The elastomeric coating 110 may be bonded to the plug segment 80 by any technique known in the art, and is preferably bonded with a rubber tearing bond. For the purposes of this description, a rubber tearing bond is defined as a destructive bond between an elastomeric material and a second material, wherein the elastomeric material will mechanically fail before the bond fails when forces are applied to the elastomeric material that would otherwise cause the elastomeric material to separate from the second material. The elastomeric coating 110 is preferably ethylene propylene diene monomer (EPDM) rubber. However, any elastomeric material capable of elastic deformation may be used.

Figure 3:
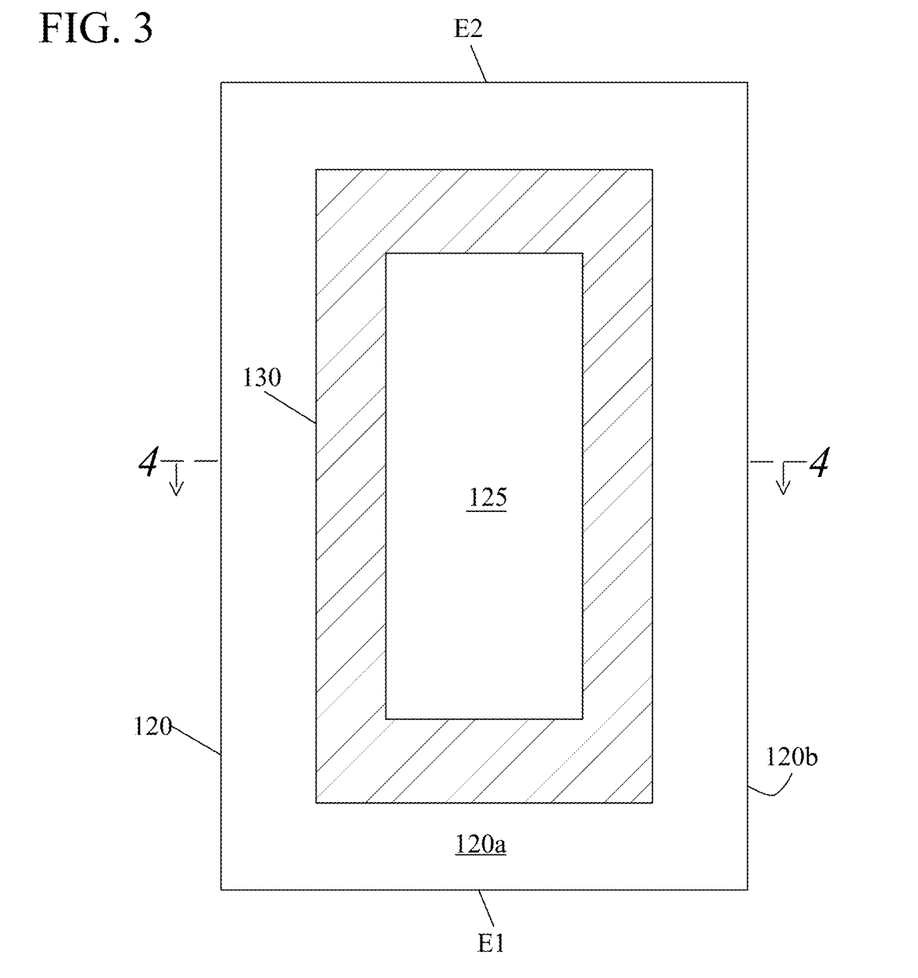
FIG. 3 shows a front view of a valve facing with an elastomeric coating.

FIG. 3 shows a valve facing 120. The valve facing 120 is metal plate with a first end E1 and a second end E2, and in preferred embodiments is constructed of stainless steel. However, any other structural material that provides structural rigidity and are non-reactive to fluids passing through the cartridge seated plug valve may also be used, such as carbon fiber, structural plastic, or other metals, for example. The valve facing 120 has a first 120a side to which an elastomeric gasket 130 is applied. The elastomeric gasket 130 surrounds a central aperture 125 of the valve facing 120. The elastomeric gasket 130 may cover the entire first side 120a of the valve facing 120, or may be limited to an area that will mate with the inlet seal surface 22 when the valve facing 120 is positioned in the cylindrical valve chamber 40 at the position of the inlet 20.

Figure 4:
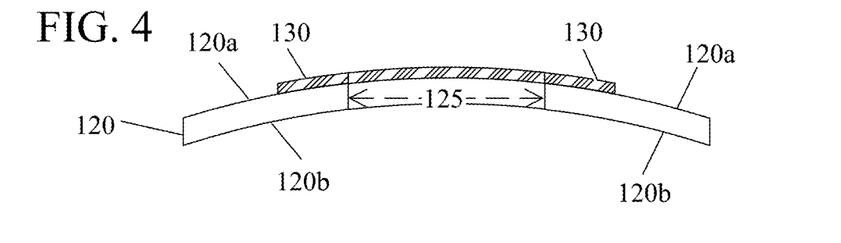
FIG. 4 shows a cross-section of a valve facing indicated by 4 in FIG. 3.

The elastomeric gasket 130 is preferably made of ethylene propylene diene monomer (EPDM) rubber. However, any elastomeric material capable of elastic deformation may be used. The elastomeric gasket 130 may be bonded to the first side 120a of the valve facing 120 by any technique known in the art, and is preferably bonded with a rubber tearing bond. FIG. 4 shows a cross section of the valve facing of FIG. 3.

Referring again to FIG. 1, the cartridge seated plug valve is assembled by first placing the valve facing 120 into the cylindrical valve chamber 40, with the first end E1 of the valve facing 120 being accepted by the first facing channel 140a. The valve facing 120 is also positioned at the location of the inlet seal surface 22, with the elastomeric gasket 130 being held in compression against the inlet seal surface 22. The central aperture 125 of the valve facing 120 coincides with the inlet 20 of the hollow valve body 10.

The main stem 100 of the rotor 75 is assembled through the main stem journal 101 of the valve cover 70, and other elements such as journal seals, packing, and end play adjustment mechanisms are also assembled to complete the cartridge.

The rotor 75 is then inserted into the cylindrical valve chamber 40 and oriented, as shown in FIG. 1 and FIG. 5, so that the trunnion 90 is received by the trunnion journal 91. When the cartridge is fully inserted into the cylindrical valve chamber 40, and the valve cover 70 is bolted to the hollow valve body 10, the second end E2 of the valve facing 120 is received by the second facing channel 140b, and the elastomeric gasket 130 of the valve facing 120 tightly against the inlet seal surface 22 of the inlet 20. The first facing channel 140a and the second facing channel 140b, both being co-axial with, and adjacent to, the inlet seal surface 22 at each end of the cylindrical valve chamber 40, ensures a tight seal between the valve facing 120 and the inlet seal surface 22.

When the cartridge seated plug valve is in a closed state, the elastomeric coating 110 of the plug seal surface 85 of the plug segment 80 of the rotor 75 is held tightly against the second side 120b of the valve facing 120, covering the central aperture 125 of the valve facing 120, so that flow of a fluid from the inlet through the valve facing 120 is blocked.

Figure 6:
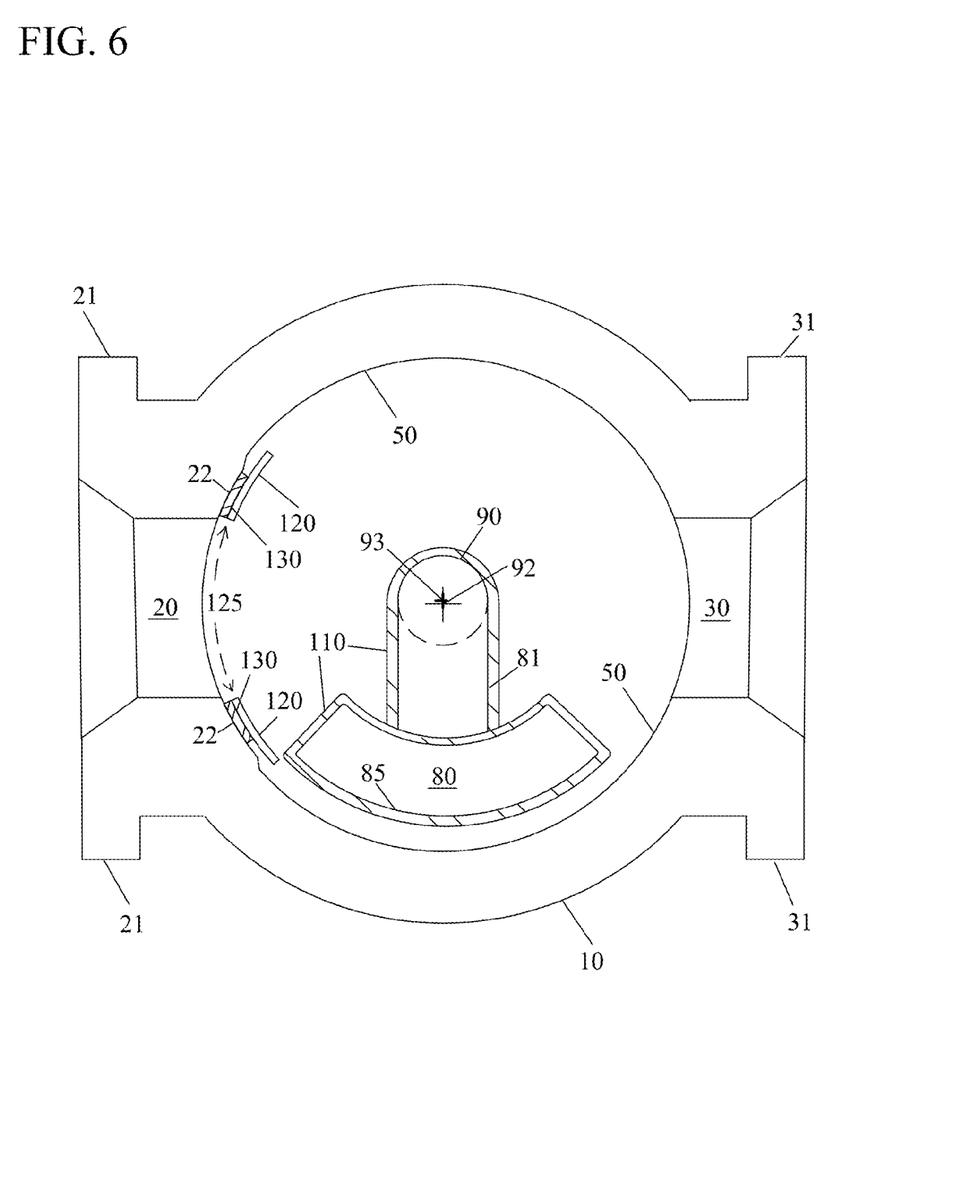
FIG. 6 shows a cross-section of a cartridge seated plug valve in an open position at a location indicated by 6 in FIG. 1.

The cartridge seated plug valve is opened by rotating the main stem 100, generally one-quarter turn relative to the inlet 20, so that the plug segment 80 rotates away from the position of the inlet 20. Because the rotor axis 93 is offset relative to the valve chamber axis 92, and the distance between the plug seal surface 85 and the rotor axis 93 is fixed by the lengths of the first elbow segment 81 and the second elbow segment 82, as the plug segment 80 rotates away from the inlet 20, the plug segment 80 also moves radially away from the wall 50 of the cylindrical valve chamber 40. Thus, frictional forces between the wall 50 of the cylindrical valve chamber 40 are minimized when the plug segment 80 of the rotor 75 is moved to a second position away from the inlet 20.

When the rotor 75 is returned to the first position, the plug segment 80 moves radially toward the wall 50 of the cylindrical valve chamber 40 and the inlet seal surface 22, and compresses the elastomeric coating 110 of the plug seal surface 85 against the second side 120b of the valve facing 120, covering the central aperture 125 of the valve facing 120 to create a fluid-tight seal.

The cartridge seated plug valve described herein provides a number of advantages over the prior art. Nickel alloy may be significantly more expensive than, for example, stainless steel. Thus, by removing nickel allow seating rings, a significant reduction in manufacturing costs may be achieved. Similarly, whereas incorporation of nickel alloy seating rings into either a hollow valve body 10 or a plug segment 80 of a rotor 75 may require significant machining of seal surfaces after casting to ensure a tight seal during valve operation, the valve facing 120 and elastomeric gasket 130 described herein are easily formed, require lower tolerances at inlet seal surfaces 22, and may be rapidly replaced in the field. In addition, the elastomeric coating 110 of the rotor 75 may be replaced as necessary by reworking rotors 75 with damaged or worn elastomeric coatings 110.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A cartridge seated plug valve comprising:
   a) a hollow valve body comprising:
      i) a cylindrical valve chamber with a first end and a second end, a wall with a radius of curvature having an origin at a cylindrical valve chamber axis defined between the first end and the second end;
      ii) an inlet passing from an outside of the hollow valve body through the hollow valve body into the cylindrical valve chamber at a first location on the wall;
      iii) an inlet seal surface surrounding the inlet on the wall; and
      iv) an outlet passing from an outside of the hollow valve body through the hollow valve body into the cylindrical valve chamber at a second location on the cylindrical valve chamber wall;
   b) a base attached to the hollow valve body sealing the first end of the cylindrical valve chamber, comprising:
      i) an inner side including a trunnion journal with a center for receiving a trunnion, the center of the trunnion journal being radially offset from the cylindrical valve chamber axis; and
      ii) a first facing channel adjacent the inlet seal surface of the hollow valve body;
   c) a valve cover attached to the hollow valve body sealing the second end of the cylindrical valve chamber, comprising:
      i) an inner side;
      ii) an outer side;
      iii) a main stem journal with a center for receiving a main stem passing from the inner side of the valve cover to the outer side of the valve cover, the center of the main stem journal being radially offset from the cylindrical valve chamber axis;
      iv) a second facing channel adjacent to the inlet seal surface of the hollow valve body, arcuate in shape and with a radius of curvature whose origin is coincident with the valve chamber axis, the second facing channel being aligned with at least an arc length of the first facing channel when the valve cover and base are assembled with the hollow valve body, and following a circumferential path, at a radial distance from the valve chamber axis from a location at a first side of the inlet, past the inlet and to a location at a second side of the inlet; and
      v) a rotor axis defined by the center of the main stem journal and the center of the trunnion journal;
   c) a rotor, rotatable from a first orientation in which flow of a fluid from the inlet into the cylindrical valve chamber is blocked, to a second orientation permitting flow of a fluid from the inlet of the hollow valve body into the cylindrical valve chamber, comprising:
      i) a plug segment with a first end, a second end, and a seal surface with an elastomeric coating bonded to at least a portion of the seal surface;
      ii) a first elbow segment coupling the first end of the plug segment to a main stem rotatably held by the main stem journal of the valve cover; and
      iii) a second elbow segment coupling the second end of the plug segment to a trunnion rotatably held by the trunnion journal of the base;
      the first elbow segment and the second elbow segment holding the plug segment parallel to the rotor axis and adjacent the inlet seal surface when the rotor is in the first orientation; and
   d) a valve facing comprising:
      i) a curved body with a first side and a second side opposite the first side, a first end held in the first facing channel and a second end held in the second facing channel, the second end being dimensioned such that the second end fits into the circumferential path of the second facing channel from the location at the first side of the inlet to the location at the second side of the inlet, preventing the curved body from rotating within the valve chamber so that alignment with the inlet is maintained;
      ii) a central aperture passing through the curved body from the first side to the second side, and aligned with the inlet of the hollow valve body; and
      ii) an elastomeric gasket bonded to the first side of curved body surrounding the central aperture;
   such that when the rotor is in the first orientation, the plug segment of the rotor is positioned with the elastomeric coating of the seal surface of the plug segment of the rotor in compression against the second side of the curved body of the valve facing and sealing the central aperture of the curved body of the valve facing, and when the rotor is rotated to a second orientation, the plug segment of the rotor is positioned a distance from the central aperture of the curved body of the valve facing.

2. The cartridge seated plug valve of claim 1, wherein the curved body of the valve facing is made of stainless steel.

3. The cartridge seated plug valve of claim 1, wherein the elastomeric gasket of the valve facing is made of rubber.

4. The cartridge seated plug valve of claim 1, wherein the elastomeric gasket of the valve facing is bonded to the curved body of the valve facing with a rubber tearing bond.

5. The cartridge seated plug valve of claim 1, wherein the elastomeric coating of the plug segment of the rotor is made of rubber.

6. The cartridge seated plug valve of claim 1, wherein the elastomeric coating of the plug segment of the rotor is bonded to the seal surface of the plug segment of the rotor with a rubber tearing bond.

* * * * *